July 28, 1953
G. H. PEGUET ET AL
2,646,756
ROTARY MACHINE ADAPTED TO OPERATE
AS A PUMP, COMPRESSOR, OR MOTOR
Filed July 31, 1947
2 Sheets-Sheet 1
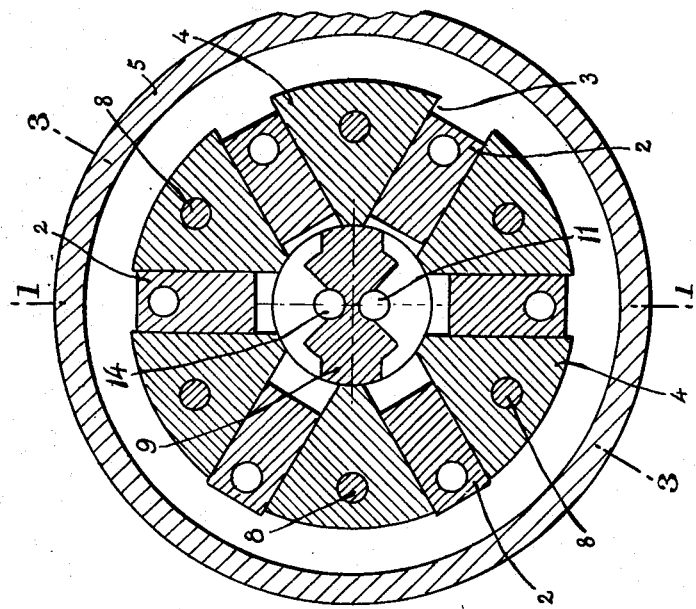
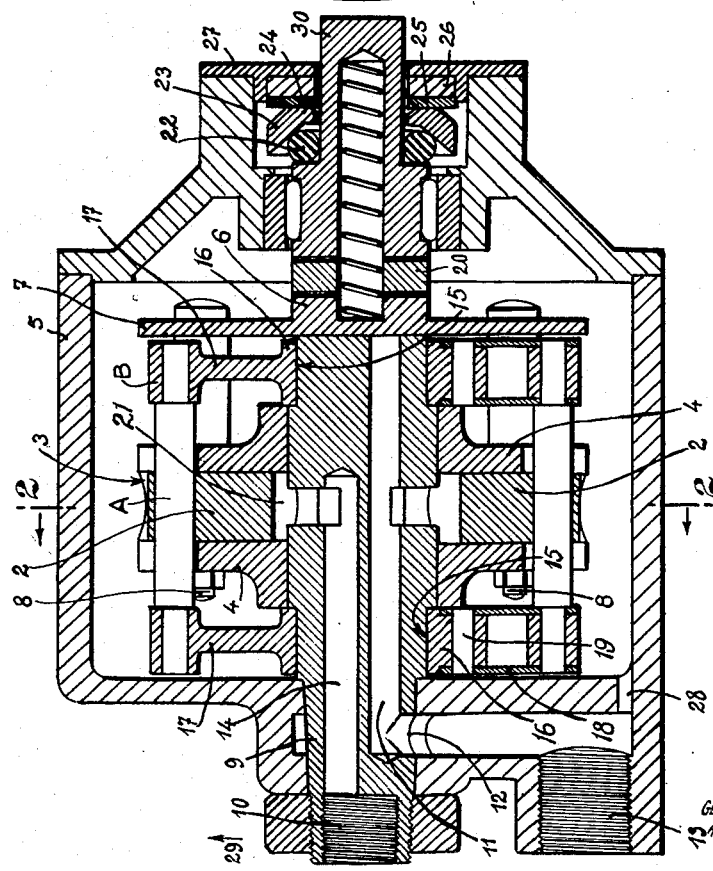
Inventors
GEORGES HIPPOLYTE PEGUET
ANDRÉ GUYENNON
by Ott Mark
THEIR ATTY Inventors
GEORGES HIPPOLYTE PEGUET
ANDRÉ GUYENNON

UNITED STATES PATENT OFFICE 2,646,756

ROTARY MACHINE ADAPTED TO OPERATE AS A PUMP, COMPRESSOR, OR MOTOR

Georges Hippolyte Péguet and André Guyennon, Montpellier, France

Application July 31, 1947, Serial No. 764,971
In France November 24, 1945

Section 1, Public Law 690, August 8, 1946
Patent expires November 24, 1965

4 Claims. (Cl. 103—161)

Our invention has for its object improvements in rotary piston machines of the type wherein the pistons are radially housed in a carrier rotatably mounted on a central stationary support operating as a fluid distributor while the pistons are connected with connecting rods located in planes perpendicular to the axis of rotation.

One of the objects of our invention is to provide a machine of reduced bulk and high efficiency through the incorporation of driving means for the rotary body, that are constituted by members located in the space left free between the connecting rods arranged to either side of the rotary body.

A still further object consists in ensuring perfect fluid-tightness of the machine through improved packing means so as to prevent any leak of fluid along the stationary support or shaft and also any entrance of air when the feed of the machine is operated under depression which would lead to a reduction in the output of the machine and would objectionably affect the lubrication of the connecting rods.

A still further object of the invention is to obtain a statically and dynamically balanced machine allowing a high rate of rotation without any vibrations being allowed as obtained by the special shape given to the master connecting rod to the head of which are pivotally secured the auxiliary connecting rods.

Lastly a further object of the invention is to provide a machine wherein the losses of energy through friction are reduced to a minimum through means to be disclosed hereinafter.

We have shown diagrammatically and by way of example in accompanying drawings a preferred embodiment of a pump or compressor according to our invention. In said drawings:

Fig. 1 is a longitudinal cross-section of the machine.

Fig. 2 is a transversal cross-section through line II—II of Fig. 1.

The machine illustrated includes a plurality of pistons 2 distributed along equidistant radii, said pistons being adapted to move in corresponding radial cylinders 3 formed to this purpose in the rotary body 4 rotating inside the stationary casing 5.

Figure 3:
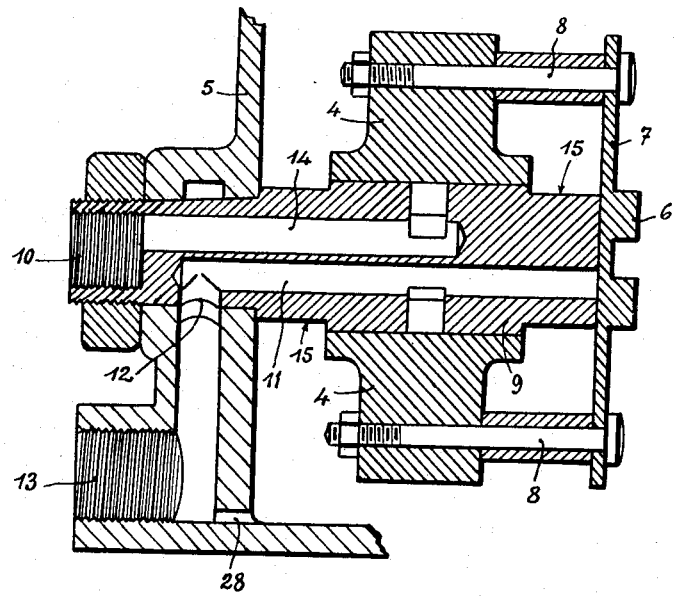
Fig. 3 is a longitudinal cross-section through line III—III of Fig. 2 after removal of the connecting rods.
Figure 4:
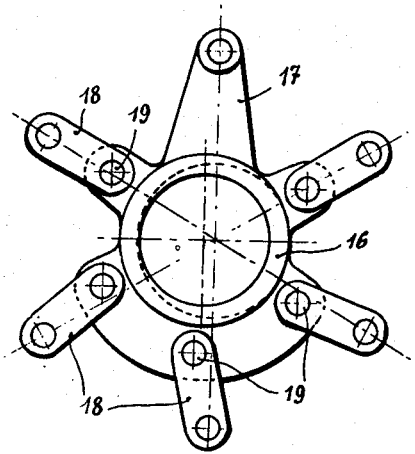
Fig. 4 is an end view partly sectional of an outer roller bearing ring forming the master connecting rod to which are pivotally secured the auxiliary connecting rods.

The rotary movement is transmitted from or to an outer rotary member to or from a part 6 (Fig. 3) that is preferably one of the components of the well-known transmitting means known as an Oldham clutch.

Said member 6 is rigid with radial arms 7 and longitudinal projections 8 at the end of the latter that are adapted to drive the rotary body 4 round the stationary shaft 9 serving as a distributor and lying coaxially inside said body.

The distribution is provided through the fact that the shaft 9 has a radial and part longitudinal bore 11 communicating through the port 12 with the pipe 13 connected with the suction means while a further longitudinal bore 14 is connected with the delivery at 10 and with a radial bore in the plane of the pistons.

In order to distribute the driving stresses transmitted to the pistons, each of the latter is controlled by two connecting rods arranged symmetrically to either side of the rotary body 4 and having the same eccentric axis. To this purpose the rotary body carries at either end two eccentric cams 15 round each of which is mounted a ring 16 with the radially directed master connecting rod 17 the foot of which B is pivotally secured to one of the pistons 2 through a transverse spindle A swivelling in the associated master connecting rods 17 to each side of the body 4. The other pistons are carried by similar spindles A (Fig. 1 lower part thereof) pivotally secured to the outer end of each of said pistons round an axis parallel with the axis of rotation. The outer ends of such spindles A are held in the outer ends of the corresponding auxiliary connecting rods 18 through the agency of a pair of plates perpendicular to the axis of rotation and forming the side walls of the connecting rod. Said connecting rods 18 are pivotally connected in their turn at 19 to the periphery of the head of the master connecting rod 16.

It is thus apparent that the rotation of the body 4 carrying the pistons 2 carries along with it through the agency of the latter the master connecting rods to which said pistons are connected; this provides for the rotation of the connecting rod heads 16 over the needles 1 round the eccentric cam 15 on the distributing shaft 9 whereby the different pistons 2 are constrained to reciprocate inside the corresponding cylinders.

During the return movement of a piston towards the shaft, it urges the volume of fluid sucked in into the delivery channel or bore 14 with which it is now in communication through its inner end.

As in certain applications the inside of the casing may be submitted to the depression produced by the suction means, this might lead to an objectionable entrance of air that would be detrimental to the proper operation of the machine and consequently it is necessary to provide for perfect fluidtightness. To this purpose, the fluidtightness of the casing is ensured as follows: on the shaft 30 and angularly rigid with part 6 is fitted a ring of synthetic rubber 22 assuming the shape of a torus and submitted to the pressure of a frustoconical steel ring 23 provided with an annular abutment 26 bearing in its turn against a layer of self lubricating moulded material 25 preferably of the type including graphite particles and resting against a rubber cushion 24, the whole arrangement being held in proper position by the cover 27 closing the casing 5.

The torus-shaped member provides consequently for fluidtightness with reference to the rotary shaft and according to the conditions of mounting and by reason of the small contacting area between the torus and the shaft, the former may slide easily over the latter and its spring urges it to follow the slight axial shifting movement of the shaft without the conical member moving out of contact with reference to the stationary surface forming a thrust bearing for it. Furthermore the torus-shaped member may swell under the action of the oil it may incorporate, without this increasing substantially the pressure exerted by it against the shaft which pressure is adjusted through the pressure of the spring urging the shaft 30 away from part 6 and consequently the torus 22 against the conical member 23. Thus in no case does the pressure of the torus on the shaft substantially vary in an undesired manner and there is no risk of the torus seizing on the shaft.

This arrangement is described solely by way of exemplification as it is apparent that it might be designed in a different manner; for instance the part 26 may be made of self lubricating plastic material and the member 23 of a ferrous metal or again the contact-producing spring may be housed between the cooperating shoulder of the shaft and torus 22. What is important is the simultaneous use of associated members made of the three materials considered as described, the deformable material being that constituting the torus.

A machine of the type disclosed may be used as a pump for controlling the landing gear of aircraft and the like auxiliaries as well as for controlling hydraulic presses, for hydraulic transmission in machine tools or the like applications requiring a great adaptability, for controlling various appliances for feeding fluid under pressure into liquid fuel heating apparatuses and for the transfer of such fluids from one container into the next and the like applications.

Our improved machine is reversible and may be used as a prime mover when it is fed with fluid under sufficient head.

What we claim is:

1. A rotary machine of the radial piston type comprising a central stationary fluid distributor, a rotary body adapted to rotate coaxially round the distributor and provided with radial bores cooperating with said distributor, pistons adapted to reciprocate in the corresponding bores, an eccentric bearing rigid with the distributor and lying in a plane substantially perpendicular to the axis of the latter to one side of the radial bores, a ring revolubly carried by the eccentric bearing and including an outer radial projection rigid with the said ring and acting as a master connecting rod, means operatively connecting the outer end of the master connecting rod with one of the pistons to constrain said piston and master connecting rod to remain permanently in a predetermined angular relationship with reference to the axis of rotation of the rotary body during the reciprocating movement of the piston considered and a plurality of auxiliary connecting rods pivotally secured to the ring and pivotally connected to the corresponding other pistons, a shaft coaxial with the rotary body, a spider-shaped plate rigid with the end of the shaft facing the rotary body and coaxial therewith, and means for locking the arms of the spider to the solid sections of the rotary body separating the different bores, a conical member fitted over the shaft, a torus-shaped member fitted inside said conical member over the shaft and adapted to provide fluidtightness along said shaft and to slide with said conical member over the shaft, a thrust bearing for the conical member and a spring urging the torus-shaped member against the conical member.

2. A rotary machine of the radial piston type comprising a central stationary fluid distributor, a rotary body adapted to rotate coaxially round the distributor and provided with radial bores cooperating with said distributor, pistons adapted to reciprocate in the corresponding bores, an eccentric bearing rigid with the distributor and lying in a plane substantially perpendicular to the axis of the latter to one side of the radial bores, a ring revolubly carried by the eccentric bearing and including an outer radial projection rigid with the said ring and acting as a master connecting rod, means operatively connecting the outer end of the master connecting rod with one of the pistons to constrain said piston and master connecting rod to remain permanently in a predetermined angular relationship with reference to the axis of rotation of the rotary body during the reciprocating movement of the piston considered and a plurality of auxiliary connecting rods pivotally secured to the ring and pivotally connected to the corresponding other pistons, a shaft coaxial with the rotary body, a spider-shaped plate rigid with the end of the shaft facing the rotary body and coaxial therewith, and means for locking the arms of the spider to the solid sections of the rotary body separating the different bores, a conical member of molded material fitted over the shaft, a torus-shaped member fitted inside said conical member over the shaft and adapted to provide fluid tightness along said shaft and to slide with said conical member over the shaft, a thrust bearing of cast iron for the conical member and a spring urging the torus-shaped member against the conical member.

3. A rotary machine of the radial piston type comprising a central stationary fluid distributor, a rotary body adapted to rotate coaxially round the distributor and provided with radial bores cooperating with said distributor, pistons adapted to reciprocate in the corresponding bores, an eccentric bearing rigid with the distributor and lying in a plane substantially perpendicular to the axis of the latter to one side of the radial bores, a ring revolubly carried by the eccentric bearing and including an outer radial projection rigid with the said ring and acting as a master connecting rod, means operatively connecting the outer end of the master connecting rod with one of the pistons to constrain said piston and master connecting rod to remain permanently in a predetermined angular relationship with reference to the axis of rotation of the rotary body during the reciprocating movement of the piston considered and a plurality of auxiliary connecting rods pivotally secured to the ring and pivotally connected to the corresponding other pistons, a shaft coaxial with the rotary body, a spider-shaped plate rigid with the end of the shaft facing the rotary body and coaxial therewith, and means for locking the arms of the spider to the solid sections of the rotary body separating the different bores, a conical member fitted over the shaft, said conical member extending along an angle ranging between 45 and 55°, a torus-shaped member fitted inside said conical member over the shaft and adapted to provide fluidtightness along said shaft and to slide with said conical member over the shaft, a thrust bearing for the conical member and a spring urging the torus-shaped member against the conical member.

4. A rotary machine of the radial piston type comprising a central stationary fluid distributor, a rotary body adapted to rotate coaxially round the distributor, including equally distributed radial bores for cooperation with said distributor, pistons adapted to reciprocate in the corresponding bores of the rotary body and provided with transverse bores at their outer ends in parallelism with the axis of the rotary body, eccentric bearings rigid with the distributor lying in planes perpendicular to the axis of the latter to each side of the radial bores, a ring revolubly carried by each eccentric bearing including each an outer radial projection forming a master connecting rod, a spindle connecting the two ends of the two master connecting rods, parallel with the axis of the rotary body and held revolubly with slight friction by the transverse bore in one of the pistons, a plurality of auxiliary connecting rods pivotally secured to each revoluble ring, further spindles parallel to the axis of the rotary member and connecting the outer ends of the corresponding auxiliary rods and each passing with slight friction through the bore in a corresponding other piston, a shaft coaxial with the rotary body, a spider rigid with the end of the shaft facing the rotary body and including a plurality of radial arms registering with the parts of the rotary body separating the different bores, and means for rigidly securing each arm of the spider to the corresponding section of the rotary body.

GEORGES HIPPOLYTE PÉGUET.
ANDRÉ GUYENNON.

References Cited in the file of this patent

UNITED STATES PATENTS

| Number | Name | Date |
|---|---|---|
| 1,614,481 | McMullen | Jan. 18, 1927 |
| 1,843,338 | Replogle | Feb. 2, 1932 |
| 2,173,432 | Benedek | Sept. 19, 1939 |
| 2,363,162 | Tripp | Nov. 21, 1944 |
| 2,370,471 | Karlberg | Feb. 27, 1945 |
| 2,391,476 | Parenti | Dec. 25, 1945 |
| 2,398,783 | Gilbert | Apr. 23, 1946 |